US010234732B2

(12) United States Patent
Niu et al.

(10) Patent No.: US 10,234,732 B2
(45) Date of Patent: *Mar. 19, 2019

(54) DISPLAY PANEL AND DISPLAY DEVICE (71) Applicants: Shanghai Tianma Micro-electronics Co., Ltd., Shanghai (CN); Tianma Micro-Electronics Co., Ltd., Shenzhen (CN)

(72) Inventors: Lei Niu, Shanghai (CN); Zhihua Ling, Shanghai (CN); Lingxiao Du, Shanghai (CN); Jun Ma, Xiamen (CN); Sitao Huo, Shanghai (CN); Tianyi Wu, Shanghai (CN)

(73) Assignees: Shanghai Tianma Micro-electronics Co., Ltd., Shanghai (CN); Tianma Micro-electronics Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/628,893

(22) Filed: Jun. 21, 2017

(65) Prior Publication Data

US 2017/0293188 A1 Oct. 12, 2017

Related U.S. Application Data

(62) Division of application No. 14/569,552, filed on Dec. 12, 2014, now Pat. No. 9,507,218.

(30) Foreign Application Priority Data

Sep. 12, 2014 (CN) .......................... 2014 1 0466514

(51) Int. Cl.
G02F 1/1343 (2006.01)
H04N 13/305 (2018.01)
G02B 27/22 (2018.01)
G02F 1/1335 (2006.01)
G02F 1/1337 (2006.01)
(Continued)

(52) U.S. Cl.
CPC ... G02F 1/134336 (2013.01); G02B 27/2214 (2013.01); G02F 1/1368 (2013.01);
(Continued)

(58) Field of Classification Search
CPC ............................................. G02F 1/134363
USPC ........................................................ 349/141
See application file for complete search history.

(56) References Cited

U.S. PATENT DOCUMENTS 9,019,464 B2 4/2015 Yoon et al.
9,239,502 B2 1/2016 Huang et al.
(Continued)

FOREIGN PATENT DOCUMENTS

CN 1641454 A 7/2005
CN 101241278 A 8/2008
(Continued)

*Primary Examiner* — Thanh Nhan P Nguyen
(74) *Attorney, Agent, or Firm* — Anova Law Group, PLLC (57) ABSTRACT

A display panel and a display device are disclosed. Each of pixels in the display panel includes a pixel area; a switch element located near an intersection of a data line and a scan line; a pixel electrode electrically connected to the switch element; and a common electrode located on the first substrate. The common electrode comprises first common electrodes superposing data lines or scan lines and having the same first width; and second common electrodes overlapping with respective pixel areas and having the same second width, the first width is the same as the second width. Alternatively, the common electrode comprises first slits, which have the same first slit width, located above data lines and scan lines, and second slits, which have the same second slit width and are located in respective pixel areas. The first slit width is the same as the second slit width.

18 Claims, 10 Drawing Sheets

(51) Int. Cl.
*G02F 1/1362* (2006.01)
*G02F 1/1368* (2006.01)

(52) U.S. Cl.
CPC .. *G02F 1/133512* (2013.01); *G02F 1/133707* (2013.01); *G02F 1/134309* (2013.01); *G02F 1/136286* (2013.01); *H04N 13/305* (2018.05); *G02F 2001/134318* (2013.01); *G02F 2001/134345* (2013.01); *G02F 2201/121* (2013.01); *G02F 2201/123* (2013.01); *H04N 2213/001* (2013.01)

(56) References Cited

U.S. PATENT DOCUMENTS

| | | | |
|---|---|---|---|
| 2004/0263748 A1* | 12/2004 | Park | G02F 1/134363 349/141 |
| 2007/0126969 A1 | 6/2007 | Kimura et al. | |
| 2007/0195250 A1 | 8/2007 | Onogi et al. | |
| 2009/0225250 A1* | 9/2009 | Lyu | G02F 1/134363 349/44 |
| 2011/0181824 A1 | 7/2011 | Nagano | |
| 2012/0249901 A1 | 10/2012 | Sekine | |
| 2012/0249930 A1* | 10/2012 | Takano | G02F 1/133526 349/95 |
| 2013/0320346 A1 | 12/2013 | Woo et al. | |

FOREIGN PATENT DOCUMENTS

| | | |
|---|---|---|
| CN | 102749714 A | 10/2012 |
| CN | 102749761 A | 10/2012 |
| CN | 103413810 A | 11/2013 |
| CN | 103698929 A | 4/2014 |
| CN | 103777398 A | 5/2014 |

\* cited by examiner

DISPLAY PANEL AND DISPLAY DEVICE

CROSS-REFERENCES TO RELATED APPLICATIONS

This application is a divisional application of U.S. patent application Ser. No. 14/569,552, filed on Dec. 12, 2014, which claims priority to a Chinese patent application No. 201410466514.6 filed on Sep. 12, 2014 and entitled "DISPLAY PANEL AND DISPLAY DEVICE", the content of all of which is incorporated herein by reference in its entirety.

TECHNICAL FIELD

The present disclosure relates to the field of display technologies, and in particular, to a display panel and a display device.

BACKGROUND OF THE INVENTION

A commonly used display device is generally employed for displaying a two-dimensional display, but cannot directly produce depth of field information in a scene. With the continuous development of computer information technology and display technology, three-dimensional display technology has become a research focus.

Three-dimensional display technology basically includes glasses-type stereoscopic display technology and automatic stereoscopic display technology. Theautomaticstereoscopic display technology, which is also referred to as non-glasses type three-dimensional display technology, does not require for a specifically designed viewing device (such as a specificallydesigned pair of glasses or a helmet) for wearing. With the non-glasses type three-dimensional display technology, a grating device is adopted to enable the left and right eyes of a viewer to respectively see different images with a parallax therebetween, to achieve a three-dimensional display effect. The non-glasses type three-dimension display technology may include Parallax Barrier technology, Lenticular Lens technology, Directional Backlight technology, Multiple Burlier technology and the like. The Parallax Barrier technology is optical technology in which a grating is added in front of or behind the display panel to form the three-dimensional display, where parallax images are respectively mapped into the left and right eyes of the viewer through the effect of blocking lights by the grating, so that stereoscopic perception is achieved through stereoscopic fusion by the visual nerve center of human being. In the lenticular lens technology, a lenticular lens is configured to replace the grating, to separate images by the refraction of the lens.

BRIEF SUMMARY OF THE INVENTION

The present application discloses a display panel and a display device to eliminate Moire fringes generated in an image when the display panel is powered on, thus improving a display quality of the image.

The present invention provides, according to a first aspect, a display panel, which includes:
- a first substrate, a second substrate disposed opposite to the first substrate and a liquid crystal layer disposed between the first substrate and the second substrate;
- a plurality of data lines and a plurality of scan lines located on one side of the first substrate close to the liquid crystal layer. The plurality of data lines intersecting with the plurality of scan lines to form a plurality of pixels. Each of the pixels comprises a pixel area, a switch element located near an intersection of one of the data lines and one of the scan lines, and a pixel electrode located in the pixel area and electrically connected to the switch element;
- a common electrode located on one side of the first substrate close to the liquid crystal layer;
- wherein the common electrode comprises a plurality of first common electrodes superposing the plurality of data lines or the plurality of scan lines and a plurality of second common electrodes overlapping with the pixel areas, the plurality of first common electrodes have the same first width, and the plurality of second common electrodes have the same second width identical with the first width; or, the common electrode comprises a plurality of slits, comprising a plurality of first slits located above the plurality of data lines or the plurality of scan lines, and a plurality of second slits located in the pixel area, the plurality of first slits have the same first slit width, and the plurality of second slits have the same second slit width identical with the first slit width.

The present invention provides, according to a second aspect, a display device, which includes a display panel according to the first aspect.

In the display panel and display device provided in the disclosure, the width of each of a plurality of first common electrodes superposing a plurality of data lines or a plurality of scan line is set as same as the width of each of a plurality of second common electrodes overlapping with the pixel areas, or the slit width of each of a plurality of first slits in the common electrode located above the plurality of data lines or scan lines is set as same as a slit width of each of the plurality of second slits in the common electrode in the pixel areas, so that when the display panel is powered on, light intensities in the pixel areas and the electrode wiring areas are periodically and evenly distributed, Moire fringes are avoided in the overall displaying effect, thereby improving the display quality of an image.

BRIEF DESCRIPTION OF THE DRAWINGS

In order for a skilled person in the art to better understand above and other advantages of the present invention, exemplary embodiments of the present disclosure will be described below in reference with accompanying drawings, in which.

DETAILED DESCRIPTION OF THE INVENTION

The present invention will be further described in detail below with reference to accompanying drawings and embodiments. It is understood that the embodiments described herein are merely used to explain the present invention, but not to limit the present invention. Additionally, it is noted that merely relevant parts and not all parts of the present invention are illustrated in the accompanying drawings, as not to obscure the relevant details of the invention. In the drawings, same or like elements, or elements with same or like functions have same or similar reference numerals.

Figure 1A:
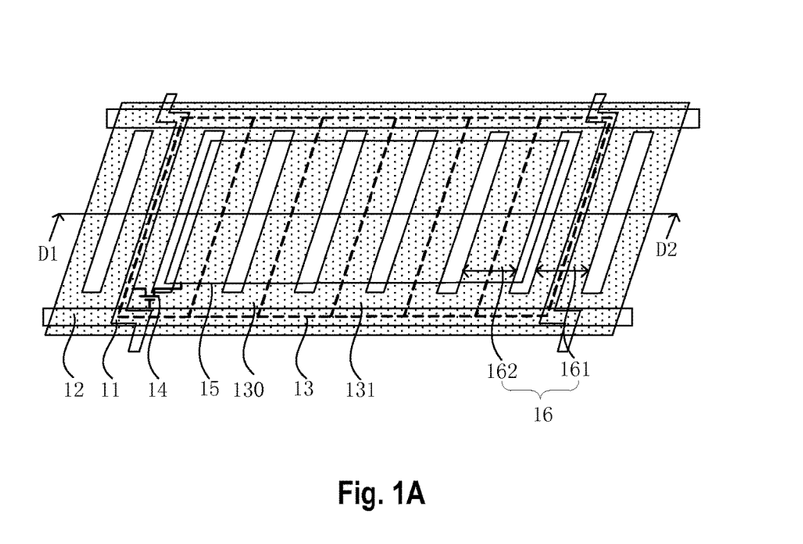
FIG. 1A is a schematic diagram of a planar structure of a display panel according to an embodiment of the disclosure.

Referring to FIG. 1A, which is a schematic diagram of a planar structure of a display panel according to an embodiment of the disclosure. The display panel includes: a first substrate (shown in FIG. 1B), a second substrate (shown in FIG. 4) disposed opposite to the first substrate and a liquid crystal layer (shown in FIG. 4) disposed between the first substrate and the second substrate, where the first substrate may be a Thin Film Transistor (TFT) substrate, and the second substrate may be a color filter substrate. The display panel further includes a plurality of data lines 11 and a plurality of scan lines 12 located on one side of the first substrate close to the liquid crystal layer, and the plurality of data lines 11 intersect with the plurality of scan lines 12 to form a plurality of pixels 13. Each of the pixels includes: a pixel area 130, a switch element 14 located near the intersection of a data line 11 and a scan line 12; a pixel electrode 15 located in the pixel area 130 and electrically connected to the switch element 14; and a common electrode 16 located on one side of the first substrate close to the liquid crystal layer, where the common electrode 16 includes: a plurality of first common electrodes 161 superposing the plurality of data lines 11, and a plurality of second common electrodes 162 overlapping with the pixel area 130. The plurality of first common electrodes 161 have the same first width A, and the plurality of second common electrodes 162 have the same second width B which is identical with the first width A.

In the present embodiment, only one pixel 13 is shown for illustration. The switch element 14 may be a TFT switch, which includes a gate electrode, a source electrode and a drain electrode. The gate electrode is generally made of an alloy such as an aluminum or molybdenum alloy, the source electrode and the drain electrode is generally made of a metal such as aluminum and molybdenum. The pixel electrode 15 is connected to the drain electrode of the TFT switch, a data line 11 is connected to the source electrode of the TFT switch, and a scan line 12 is connected to the gate electrode of the TFT switch. The pixel electrode 15 is typically formed by a transparent electrode made of indium tin oxide or indium zinc oxide. In the present embodiment, the data line may be formed in a zigzag pattern which is basically extending along a direction perpendicular to the scan line, or may be a straight line perpendicular to the scan line.

Figure 1B:
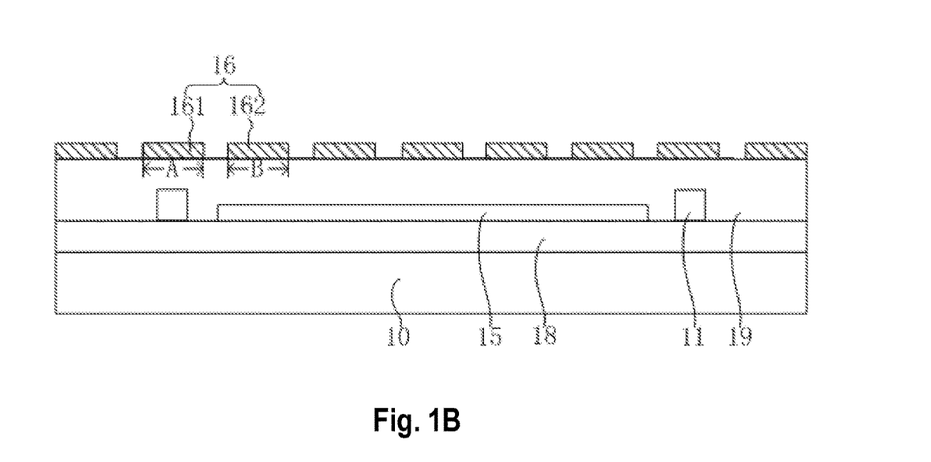
FIG. 1B is a section view taken along a line D1-D2 in FIG. 1A.

Referring to FIG. 1B which is a section view taken along a line D1-D2 in FIG. 1A. As shown, the data lines 11, the pixel electrode 15, the first common electrodes 161 and the second common electrodes 162 are located on the first substrate 10. A first insulating layer 18 between the first substrate 10 and the pixel electrode 15, and a second insulating layer 19 between the pixel electrode 15 and the common electrode 16 are exemplarily illustrated.

In the present embodiment, the plurality of the first common electrodes 161 superposing the data line 11 have the same first width A, and the plurality of the second electrodes 162 above the pixel electrode 15 have the same second width B identical with the first width A, so that when the display panel is powered on, light intensities in the pixel areas and the electrode wiring areas are periodically and evenly distributed, so that Moire fringes are avoided in the overall displaying effect, thereby improving the display quality of an image.

In other embodiments of the disclosure, the common electrode may include: first common electrodes superposing the plurality of scan lines, and a plurality of common second electrodes overlapping with the pixel area, where the first common electrodes have the same first width, and the plurality of second common electrodes have the same second width identical with the first width. More particularly, the first common electrodes are located above the scan lines and parallel to the scan lines, and the second common electrodes are located in a pixel area and parallel to the first common electrodes.

It is noted that the plurality of data lines 11 or the plurality of scan lines 12 may be superposed by slits in the common electrode or by the common electrode per se, and also the respective pixel areas 130 may be overlapped by the slits in the common electrode or by the common electrode per se. Particularly, referring to FIG. 1C which is a schematic diagram of a planar structure of another display panel according to an embodiment of the disclosure and illustrates the plurality of data lines 11 and the plurality of scan lines 12 located on one side of the first substrate (shown in FIG. 1D) close to the liquid crystal layer, where the plurality of data lines 11 intersect with the plurality of scan lines 12 to form a plurality of pixels 13. Each of the pixels includes: a pixel area 130, a switch element 14 located near the intersection of the data line 11 and the scan line 12; a pixel electrode 15 electrically connected to the switch element 14 in the pixel area 130; and a common electrode 16 located on one side of the first substrate close to the liquid crystal layer. The common electrode 16 of a pixel 13 includes a plurality of slits, including a plurality of first slits 163 located above the plurality of data lines 11, and a plurality of second slits 164 located in the pixel area 130, where the plurality of first slits 163 have the same first width A1, and the plurality of second slits 164 have the same second width B1 identical with the first width A1.

Figure 1C:
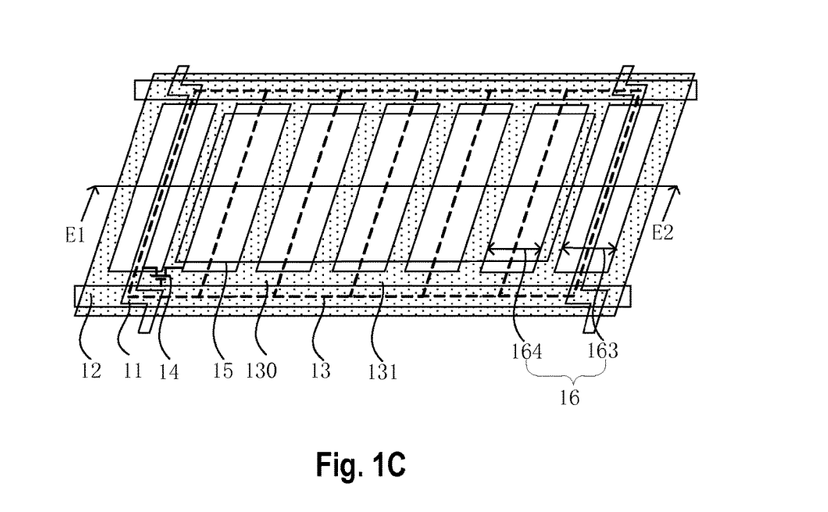
FIG. 1C is a schematic diagram of a planar structure of another display panel according to an embodiment of the disclosure.
Figure 1D:
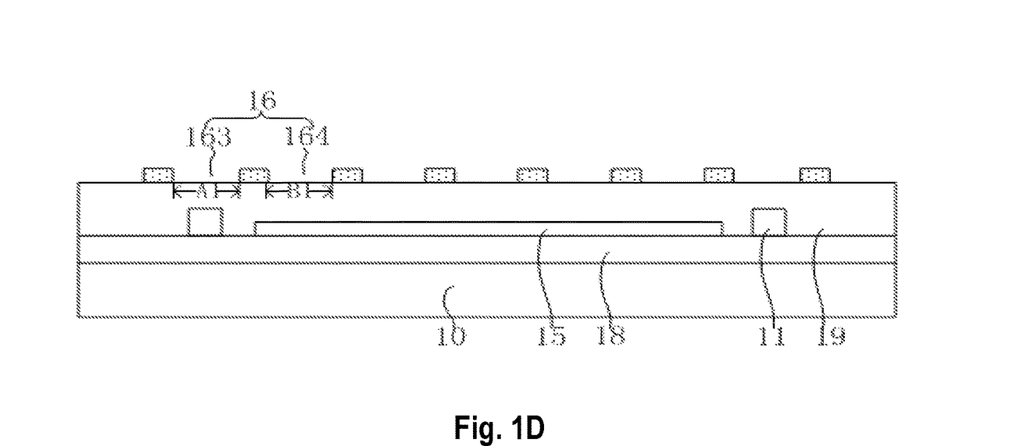
FIG. 1D is a section view taken along a line E1-E2 in FIG. 1C.

Referring to FIG. 1D which is a section view taken along a line E1-E2 in FIG. 1C, the data lines 11, the pixel electrode 15, the first slits 163 and the second slits 164 located on one side of the first substrate 10, a first insulating layer 18 between the first substrate 10 and the pixel electrode 15, and a second insulating layer 19 between the pixel electrode 15 and a common electrode 16 are exemplarily illustrated.

In the present embodiment, a width of each of the plurality of first slits 163 of the common electrode 16 located above the plurality of data lines 11 is as same as a width of each of the plurality of second slits 164 located in the pixel area 130, so that when the display panel is powered on, light intensities in the pixel areas and the electrode wiring areas are periodically and evenly distributed, so that Moire fringes are avoided in the overall displaying effect, thereby improving the display quality of an image.

It is noted that, FIG. 1B and FIG. 1D merely exemplarily illustrate the relative relationships among the data lines 11, the pixel electrode 15 and the common electrode 16, and a film on the first substrate 10 may be diversified due to various structures of the display panel. The specific film or structure between the first substrate 10 and the common electrode 16 is not specified in the present embodiment, and therefore the structure in the present embodiment is not limited by FIG. 1B and FIG. 1D. Moreover, in order to represent the emphasis of the present embodiment, some films on the substrate 10 of the display panel are omitted in FIG. 1B and FIG. 1D, and the present invention is not limited thereto.

In other embodiments of the disclosure, the common electrode of a pixel includes a plurality of first slits located above the plurality of scan lines and a plurality of second slits located in the pixel area, where the plurality of first slits have the same first slit width, and the plurality of second slits have the same second slit width identical with the first slit width. More specifically, the first slits are located above the scan lines and parallel to the scan lines, and the second slits are located in the pixel area and parallel to the first slits.

In order to further improve the quality of images displayed by the display panel and make light intensities in the pixel areas and the electrode wiring areas be periodically and evenly distributed, so that Moire fringes are avoided in the overall displaying effect, preferably each pixel 13 includes at least one second common electrode 162 or includes at least one second slit 164, and the pixel 13 is divided by the second electrode 162 or the second slit 164 into a plurality of sub-pixels 131 with the same area, referring to FIGS. 1A and 1C.

Referring to FIG. 1A, one pixel 13 is shown and the pixel 13 includes five second common electrodes 162 which divide the pixel 13 into six sub-pixels 131 having the same area.

In the present embodiment every pixel is divided by the second common electrodes 162 or the second slits 164 into sub-pixels 131 with the same area, so that the layout of the pixel 13 is made more even, and the light intensity in the pixel 13 is more evenly distributed, thus to further reduce Moire fringes.

Preferably, the data lines 11 or the scan lines 12 are formed in a zigzag pattern, each of the sub-pixels 13 has a parallelogram shape, and the sub-pixels 131 in the same row are inclined in the same direction.

Figure 1E:
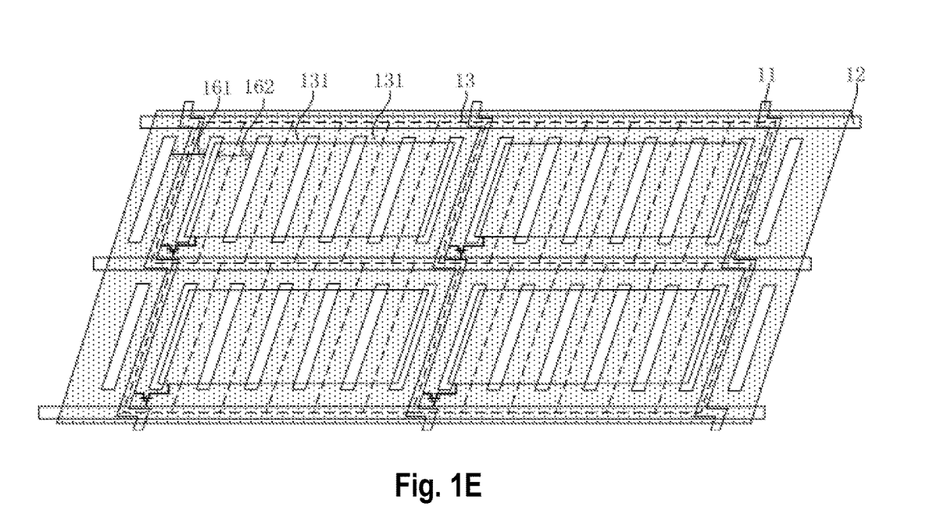
FIG. 1E is a schematic diagram of a structure of four pixels arranged in two rows and two columns according to an embodiment of the disclosure.

Referring to FIG. 1E, four pixels 13 arranged in two rows and two columns (i.e. a 2×2 array) are illustrated, each of the pixels 13 includes five second common electrodes 162 which separate the pixel 13 into six sub-pixels 131 having the same area, and each sub-pixel 131 has a parallelogram shape, and the sub-pixels 131 in the same pixel are inclined in the same direction.

Figure 1F:
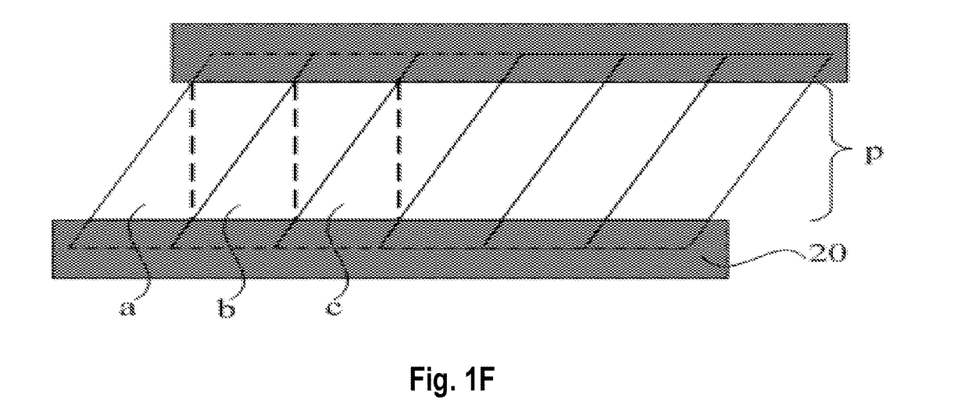
FIG. 1F is a schematic diagram of a light shielding layer according to an embodiment of the disclosure.

Preferably, referring to FIG. 1F which is a schematic diagram of a light shielding layer according to an embodiment of the disclosure, a light shielding layer 20 is disposed in areas, which correspond to the scan lines 12, on the second substrate (shown in FIG. 4), the sub-pixels 131 are partially covered by the light shielding layer 20, and the areas of the sub-pixels 131 which are uncovered by the light shielding layer 20 form a light transmitting area p which has a parallelogram shape.

Among the sub-pixels 131 of each pixel 13 on the same row, for example six sub-pixels of one pixel shown in FIG. 1F, the first three neighboring sub-pixels respectively correspond to light transmitting areas a, b and c, where a downward projection of a top side of the light transmitting area b in a sub-pixel 131 along a direction perpendicular to the row is located at and coincides with a bottom side of the light transmitting area c in a neighboring sub-pixel 131, and an upward projection of a bottom side of the light transmitting area b in the sub-pixel 131 along the direction perpendicular to the row is located at and coincides with a top side of the light transmitting area a in another neighboring sub-pixel 131.

Figure 2A:
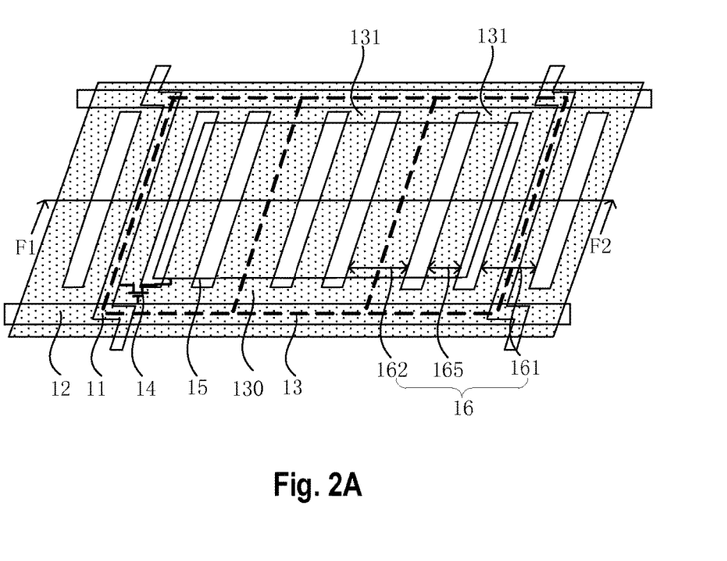
FIG. 2A is a schematic diagram of a planar structure of another display panel according to an embodiment of the disclosure.

Referring to FIG. 2A, which is a schematic diagram of a planar structure of another display panel according to an embodiment of the disclosure, the display panel in the present embodiment includes: a first substrate (shown in FIG. 2B), a second substrate (shown in FIG. 4) disposed opposite to the first substrate, a liquid crystal layer (shown in FIG. 4) disposed between the first substrate and the second substrate, and a plurality of data lines 11 and a plurality of scan lines 12 located on one side of the first substrate close to the liquid crystal layer, where the plurality of data lines 11 intersect with the plurality of scan lines 12 to form a plurality of pixels 13, each of which includes: a pixel area 130, a switch element 14 located near the intersection of a data line 11 and a scan line 12; a pixel electrode 15 located in the pixel area 130 and electrically connected to the switch element 14; and a common electrode 16 located on one side of the first substrate close to the liquid crystal layer, where the common electrode 16 includes: a plurality of first common electrodes 161 superposing the plurality of data lines 11, and a plurality of second common electrodes 162 and a plurality of third common electrodes 165 overlapping with the pixel area 130. The plurality of first common electrodes 161 have the same first width A, the plurality of second common electrodes 162 have the same second width B which is identical with the first width A, and the plurality of third common electrodes 165 have the same third width C, where the third width C may be as same as or different from the first width A or the second width B. In the present embodiment, the data lines may be formed in a zigzag pattern basically extending along a direction perpendicular to the scan lines, or may be straight lines perpendicular to the scan lines.

Figure 2B:
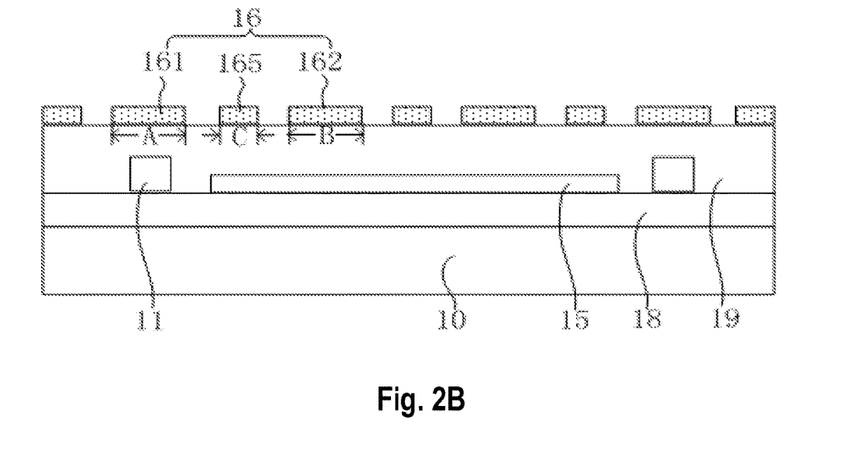
FIG. 2B is a section view taken along a line F1-F2 in FIG. 2B.

Referring to FIG. 2B which is a section view taken along a line F1-F2 in FIG. 2A; the data lines 11, the pixel electrode 15, the first common electrodes 161, the second common electrodes 162 and the third common electrodes 165 which are located on one side of the first substrate 10, a first insulating layer 18 between the first substrate 10 and the pixel electrode 15, and a second insulating layer 19 between the pixel electrode 15 and the common electrode 16 are exemplarily illustrated.

In the present embodiment, the width A of each of the first common electrodes 161 located above the data lines 11 is as same as the width B of each of the second common electrodes 162 overlapping with the pixel area 130, and the width A of each of the first common electrodes 161 located above the data lines 11 may be as same as or different from the width C of each of the third common electrodes 165 overlapping with the pixel area 130, so that when the display panel is powered on, Moire fringes are avoided in the overall displaying effect, thereby improving the display quality of an image.

In other embodiments of the disclosure, the common electrode of a pixel may include first common electrodes superposing the plurality of scan lines, and a plurality of second electrodes and a plurality of third common electrodes which are overlapping with the pixel area, where the plurality of first common electrodes have the same first width, the plurality of second common electrodes have the same second width identical with the first width, and the plurality of third common electrodes have the same third width which is as same as or different from the first width or the second width. More particularly, the first common electrodes are above the scan lines and parallel to the scan lines, and the second common electrodes and the third common electrodes are located in a pixel area and parallel to the first common electrodes.

It is noted that the plurality of data lines 11 or the plurality of scan lines 12 may be superposed by slits in the common electrode or by the common electrode per se, and also the respective pixel areas 130 may be overlapped by the slits in the common electrode or by the common electrode per se. Particularly, referring to FIG. 2C which is a schematic diagram of a planar structure of another display panel according to an embodiment of the disclosure, a common electrode 16 may include a plurality of third slits 166 having the same first width C1 located in the pixel 13, and the third width C1 is as same as or different from the first width A1 or the second width B1.

Figure 2C:
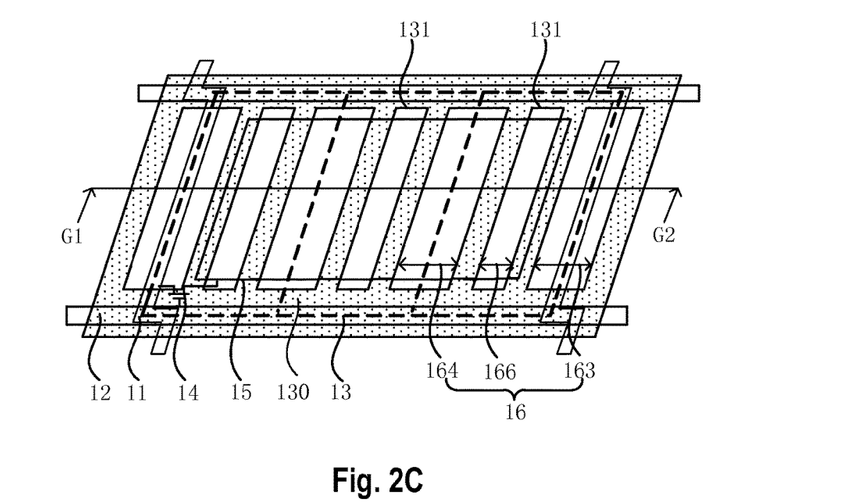
FIG. 2C is a schematic diagram of a planar structure of another display panel according to an embodiment of the disclosure.
Figure 2D:
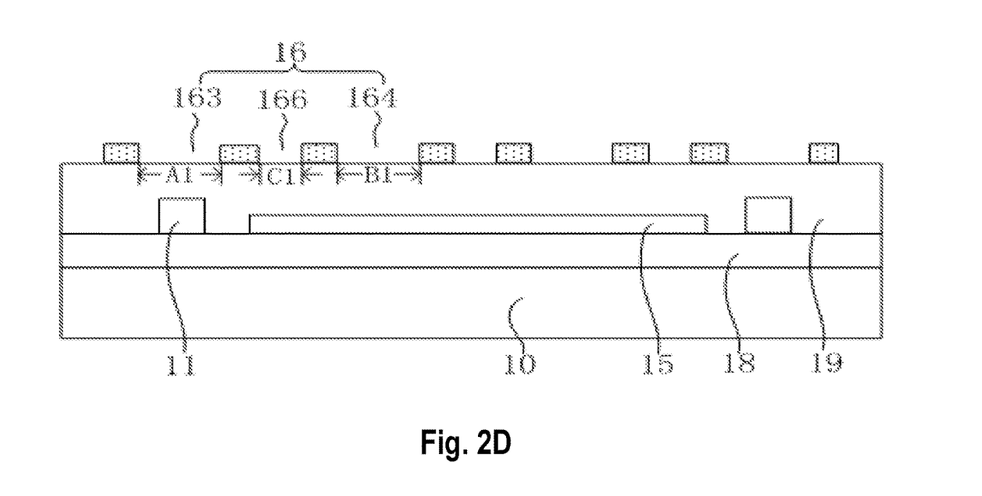
FIG. 2D is a section view taken along a line G1-G2 in FIG. 2C.

Referring to FIG. 2D which is a section view taken along a line G1-G2 in FIG. 2C, data lines 11, a pixel electrode 15, first slits 163, second slits 164 and third slits 166 located above the first substrate 10, a first insulating layer 18 between the first substrate 10 and the pixel electrode 15, and a second insulating layer 19 between the pixel electrode 15 and a common electrode 16 are exemplarily illustrated.

In the present embodiment, a width A1 of each of the plurality of first slits 163 of the common electrode 16 in a pixel 13 located above the plurality of data lines 11 is as same as a width B1 of each of the plurality of second slits 164 located in the pixel area 130, and a width C1 of each of the plurality of third slits 166 located in the pixel area 130 is as same as or different form the width A1 of the first slit 163 and the width B1 of the second slit 164.

It is noted that, FIG. 2B and FIG. 2C merely exemplarily illustrate the relative relationships among the data lines 11, the pixel electrode 15 and the common electrode 16, and a film on the first substrate 10 may be diversified due to various structures of the display panel. The specific film or structure between the first substrate 10 and the common electrode 16 is not specified in the present embodiment, and therefore the structure in the present embodiment is not limited by FIG. 2B and FIG. 2D. Moreover, in order to represent the emphasis of the present embodiment, some films on the substrate 10 of the display panel are omitted in FIG. 2B and FIG. 2D, and the present invention is not limited thereto.

In other embodiments of the disclosure, the common electrode of a pixel includes a plurality of first slits located above the plurality of scan lines, and a plurality of second slits and a plurality of third slits located in the pixel area, where the plurality of first slits have the same first slit width, the plurality of second slits have the same second slit width identical with the first slit width, and the plurality of third slits have the same third slit width which is as same as or different from the first slit width or the second slit width. More specifically, the first slits are located above the scan lines and parallel to the scan lines, and the second slits and the third slits are located in the pixel area and parallel to the first slits.

In order to further improve the quality of images displayed by the display panel, and make light intensities in the pixel areas and the electrode wiring areas be periodically and evenly distributed, so that Moire fringes are avoided in the overall displaying effect, preferably at least one third common electrode 165 is disposed between the first common electrode 161 and the second common electrode 162, and at least one third common electrode 165 is disposed between the second electrodes 162; or at least one third slit 166 is disposed between the first slit 163 and the second slit 164, and at least one third slit 166 is disposed between the second slits 164. Referring to FIG. 2A showing a pixel 13, a third common electrode 165 is disposed between the first common electrode 161 and the second common electrode 161, a third common electrode 165 is disposed between two second common electrodes 162, and the pixel 13 is divided by those two second common electrodes 162 into three sub-pixels 131 with the same area. Referring to FIG. 2C showing a pixel 13, a third slit 166 is disposed between the first slit 163 and the second slit 164, a third slit 166 is disposed between two second slits 164, and the pixel 13 is divided by those two second slits 164 into three sub-pixels 131 with the same area.

In the present embodiment, the third common electrodes 165 as well as the first common electrodes 161 and the second common electrodes 162 are distributed evenly and separately, or the third slits 166 as well as the first slits 163 and the second slits 164 are distributed evenly and separately, and the pixel 13 is divided by the second common electrodes 162 or second slits 164 into sub-pixels 131 with the same area, so that when the display panel is powered on, light intensities in the pixel areas and the electrode wiring areas are periodically and evenly distributed, and Moire fringes are avoided in the overall displaying effect, thereby improving the display quality of an image.

Preferably, the data line 11 or the scan line 12 is formed in a zigzag pattern, each sub-pixel 131 has a parallelogram shape, and sub-pixels 131 in the same row are inclined in the same direction.

Figure 2E:
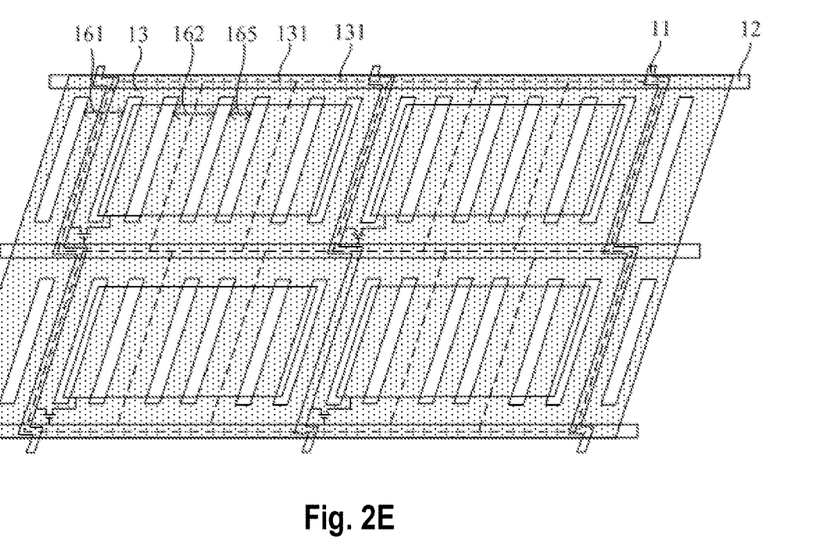
FIG. 2E is a schematic diagram of a structure of four pixels arranged in two rows and two columns according to an embodiment of the disclosure.

Referring to 2E, four pixels 13 arranged in two rows and two columns are illustrated, one third common electrode 165 is disposed between the first common electrode 161 and the second common electrode 162, one third common electrode 165 is disposed between two second common electrodes 162, and the pixel 13 includes two second common electrodes 162 and is divided by these two second common electrodes 162 into three sub-pixels 131 with the same area. The data line 11 is a polygonal line, each sub-pixel 13 has a parallelogram shape, and sub-pixel 131 in the same row are inclined in the same direction.

Figure 2F:
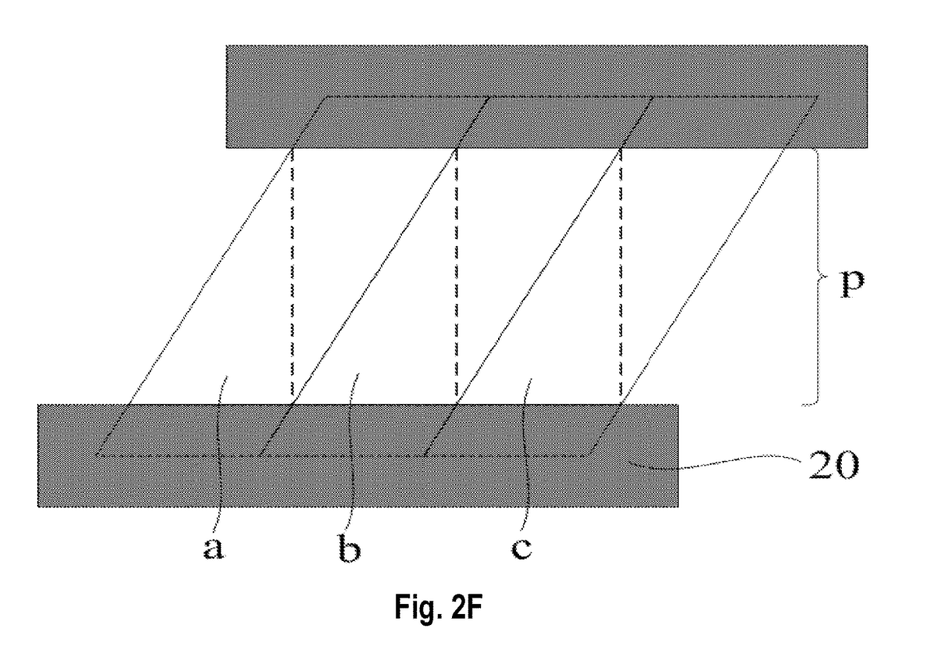
FIG. 2F is a schematic diagram of another light shielding layer according to an embodiment of the disclosure.

Preferably, referring to FIG. 2F which is a schematic diagram of another light shielding layer according to an embodiment of the disclosure, a light shielding layer 20 is disposed at areas, which correspond to the scan lines 12 or the data line 11 on the second substrate (shown in FIG. 4), the sub-pixels 131 are partially covered by the light shielding layer 20, and the areas of the sub-pixels 131, which are uncovered by the light shielding layer 20, form a light transmitting area p which has a parallelogram shape.

The respective sub-pixels 131 of each pixel 13 in the same row are shown in FIG. 1F, which illustrates three sub-pixels of a pixel which respectively correspond to light transmitting areas a, b and c, where a downward projection of a top side of the light transmitting area b in a sub-pixel 131 along a direction perpendicular to the row is located at and coincides with a bottom side of the light transmitting area c in a neighboring sub-pixel 131, and an upward projection of a bottom side of the light transmitting area b in the sub-pixel 131 along the direction perpendicular to the row is located at and coincides with a top side of the light transmitting area in another neighboring sub-pixel 131.

Figure 3A:
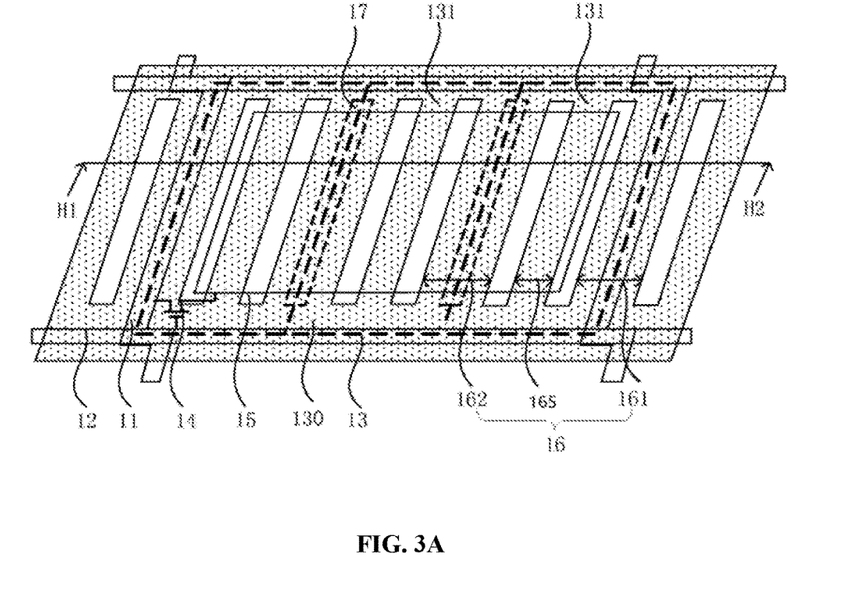
FIG. 3A is a schematic diagram of a planar structure of another display panel according to an embodiment of the disclosure.

Referring to FIG. 3A, which is a schematic diagram of a planar structure of another display panel according to an embodiment of the disclosure, the another display panel according to the present embodiment of the disclosure differs from the display panel according to above embodiment by further including a plurality of dummy electrodes 17 overlapping with respective pixel areas 130. The dummy electrodes 17 are parallel to the data lines 11 and located below the second common electrodes 162, and a width of each of the dummy electrodes 17 is the same as that of the date line 11. Particularly, a projection of a dummy electrode 17 on a second common electrode 162 divides the second common electrode 162 into two equal parts. In the present embodiment, the data lines may be formed in a zigzag pattern, or may be straight lines.

Figure 3B:
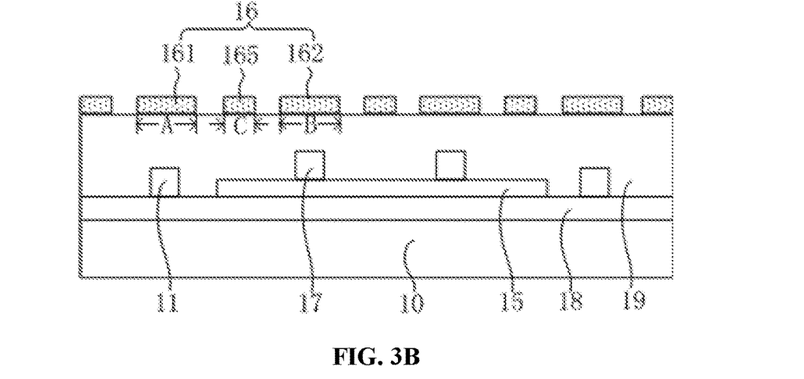
FIG. 3B is a section view taken along a line H1-H2 in FIG. 3B.

Referring to FIG. 3B which is a section view taken along a line H1-H2 in FIG. 3A, the data lines 11, a pixel electrode 15, first common electrodes 161, second common electrodes 162, third common electrodes 165, and the dummy electrodes 17 located on one side of the first substrate 10, a first insulating layer 18 between the first substrate 10 and the pixel electrode 15, and a second insulating layer 19 between the pixel electrode 15 and a common electrode 16 are exemplarily illustrated.

The data lines 11 are located above the first substrate 10, the dummy electrodes 17 are located above the pixel electrode 15, and the dummy electrodes 17 may be formed in the same layer as the data lines 11 or the scan lines 12 (shown in FIG. 3A), i.e. in manufacturing. The dummy electrodes are placed in a suspended (floating) state and not connected to any electrical potential. The first common electrodes located above the data lines 11 have the same first width A, the second common electrodes located above the dummy electrodes 17 have the same second width B identical with the first width A, and the third common electrodes 165 overlapping with the pixel area 130 have the same third width C which may be the same as or different from the first width A or the second width B.

In the present embodiment, when the display panel is powered on, light intensities in the pixel areas and the electrode wiring areas are periodically and evenly distributed, so that Moire fringes are avoided in the overall displaying effect, thereby improving the display quality of an image.

In other embodiments of the disclosure, the common electrode of a pixel may include first common electrodes superposing a plurality of the scan lines, and a plurality of second electrodes, a plurality of third common electrodes and a plurality of dummy electrodes which are overlapping with the pixel area, where the dummy electrodes are located at corresponding positions below the second common electrodes, a width of each of the dummy electrodes is as same as that of the scan line, the plurality of first common electrodes have the same first width, the plurality of second common electrodes have the same second width identical with the first width, and the plurality of third common electrodes have the same third width which is as same as or different from the first width or the second width. More particularly, the first common electrodes are above the scan lines and parallel to the scan lines, and the second common electrodes and the third common electrodes are located in the pixel area and parallel to the first common electrodes.

It is noted that the plurality of data lines 11 or the plurality of scan lines 12 may be superposed by slits in the common electrode or by the common electrode per se, and also the respective pixel areas 130 may be overlapped by the slits in by the common electrode or by the common electrode per se. Particularly, referring to FIG. 3C which is a schematic diagram of a planar structure of another display panel according to an embodiment of the disclosure and illustrates a plurality of data lines 11 and a plurality of scan lines 12 located on one side of the first substrate, where the plurality of data lines 11 intersect with the plurality of scan lines 12 to form a plurality of pixels 13, each of which includes: a pixel area 130; a switch element 14 located near the intersection of the data line 11 and the scan line 11; a pixel electrode 15 located in the pixel area 130 and electrically connected to the switch element 14; and a common electrodes 16 located on one side of the first substrate. The common electrode 16 of a pixel 13 includes a plurality of slits, including a plurality of first slits 163 located above the plurality of data lines 11 or scan lines 12, and a plurality of second slits 164 and a plurality of third slits 166 which are located in the pixel area 130, where the plurality of first slits 163 have the same first width A1, the plurality of second slits 164 have the same second width B1 identical with the first width A1, and the plurality of third slits 166 have the same third width C1 which is as same as or different from the first width A1 or the second width B1.

Figure 3C:
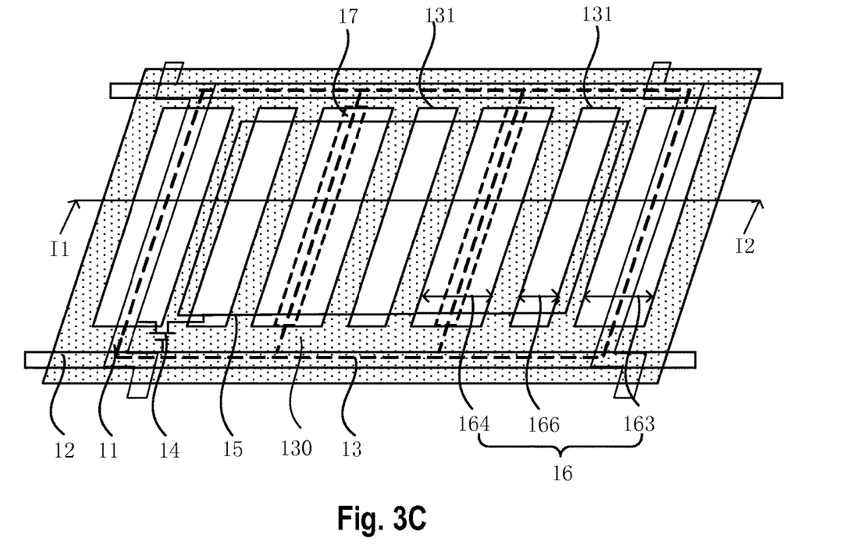
FIG. 3C is a schematic diagram of a planar structure of another display panel according to an embodiment of the disclosure.
Figure 3D:
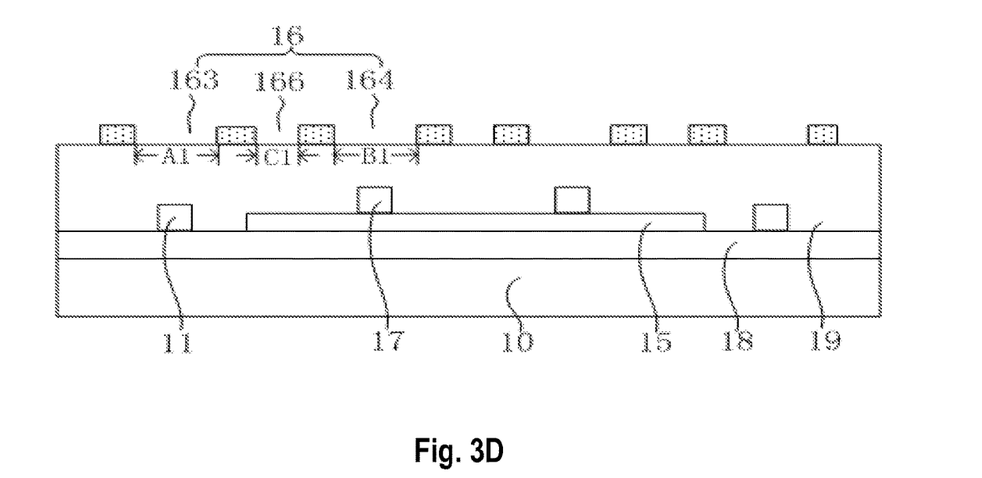
FIG. 3D is a section view taken along a line I1-I2 in FIG. 3C.

Referring to FIG. 3D which is a section view taken along a line I1-I2 in FIG. 3C, a difference between FIG. 3B and FIG. 3D lies in that the data lines 11 are superposed by the first common electrodes 161 and the pixel area 130 is overlapping with the second common electrodes 162 and the third common electrodes 165 in FIG. 3B, but in FIG. 3D, the data lines 11 are superposed by the first slits 163 in common electrode 16, the second slits 164 and the third slits 166 are located in the pixel area 130, and the dummy electrodes 17 are at corresponding potions below the second slits 164.

The first slits 163 located above the data lines 11 each have a first slit width A1, the second slits 164 located above the dummy electrodes 17 each have a second slit width B1 identical with the first width A1, and the third slits 166 located above the pixel electrode 15 each have a third slit width C1 which is as same as or different from the first slit width A1 or the second slit width B1.

In the present embodiment, when the display panel is powered on, light intensities in the pixel areas and the electrode wiring areas are periodically and evenly distributed, so that Moire fringes are avoided in the overall displaying effect, thereby improving the display quality of an image.

In other embodiments of the disclosure, the common electrode of a pixel includes a plurality of first slits located above the plurality of scan lines, as well as a plurality of second slits, a plurality of third slits and a plurality of dummy electrodes which are overlapping with the pixel area. The dummy electrodes are located at corresponding positions below the second slits, a width of each of the dummy electrode is as same as that of the data line, the plurality of first slits have the same first slit width, the plurality of second slits have the same second slit width identical with the first slit width, and the plurality of third slits have the same third slit width which is as same as or different from the first slit width or the second slit width. More specifically, the first slits are located above the scan lines and parallel to the scan lines, and the second slits are located in the pixel area and parallel to the first slits.

It is noted that FIG. 3B and FIG. 3D merely exemplarily illustrates the relative relationships among the data lines 11, the pixel electrode 15, the common electrode 16 and the dummy electrodes 17, and a film on the first substrate 10 may be diversified due to various structures of the display panel. The specific film or structure between the first substrate 10 and the common electrode 16 is not specified in the present embodiment, and therefore the structure in the present embodiment is not limited by FIG. 3B and FIG. 3D. Moreover, in order to represent the emphasis of the present embodiment, some films on the substrate 10 of the display panel are omitted in FIG. 3B and FIG. 3D, and the present invention is not limited thereto.

In order to further improve the quality of images displayed by the display panel, and make light intensities in the pixel areas and the electrode wiring areas be periodically and evenly distributed, so that Moire fringes are avoided in the overall displaying effect, preferably the data lines 11 or the scan lines 12 are formed in zigzag pattern, and each pixel 13 includes at least one second common electrode 162 or includes at least one second slit 164, and each of the pixels 13 is divided by the at least one second common electrode 162 or the at least one second slit 164 into a plurality of sub-pixels 131 with the same area, each sub-pixel 131 has a parallelogram shape, and sub-pixels 131 in the same row are inclined in the same direction.

Figure 3E:
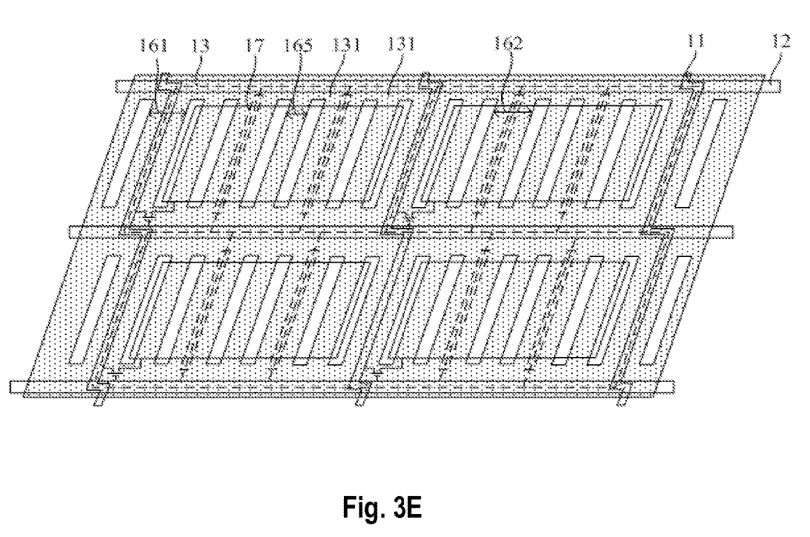
FIG. 3E is a schematic diagram of a structure of four pixels arranged in two rows and two columns according to an embodiment of the disclosure.

Referring to FIG. 3E showing four pixels 13, each of which includes two second common electrodes 162, dummy electrodes 17 are disposed at corresponding positions below the second common electrodes 162, one third common electrode 165 is disposed between the first common electrode 161 and the second common electrode 162, and one third common electrode 165 is disposed between two second common electrodes 162. The pixel 13 is divided by two second common electrodes 162 into three sub-pixels 131 having the same area, each sub-pixel 13 has a parallelogram shape, and sub-pixels 131 in the same row are inclined in the same direction.

Preferably, a light shielding layer 20 is disposed in areas, which correspond to the data lines 11 or the scan lines 12, on the second substrate, and a structure of the light shielding layer 20 is as same as that of another light shielding layer in the above embodiments, and will not be repeatedly described herein.

In the present embodiment, the pixels 13 are arranged more evenly, so that the light intensity in the pixels is more evenly distributed, thus to further reduce Moire fringes.

A display device is further provided in an embodiment of the present invention. The display device includes a display panel described in the above embodiments of the disclosure.

Figure 4:
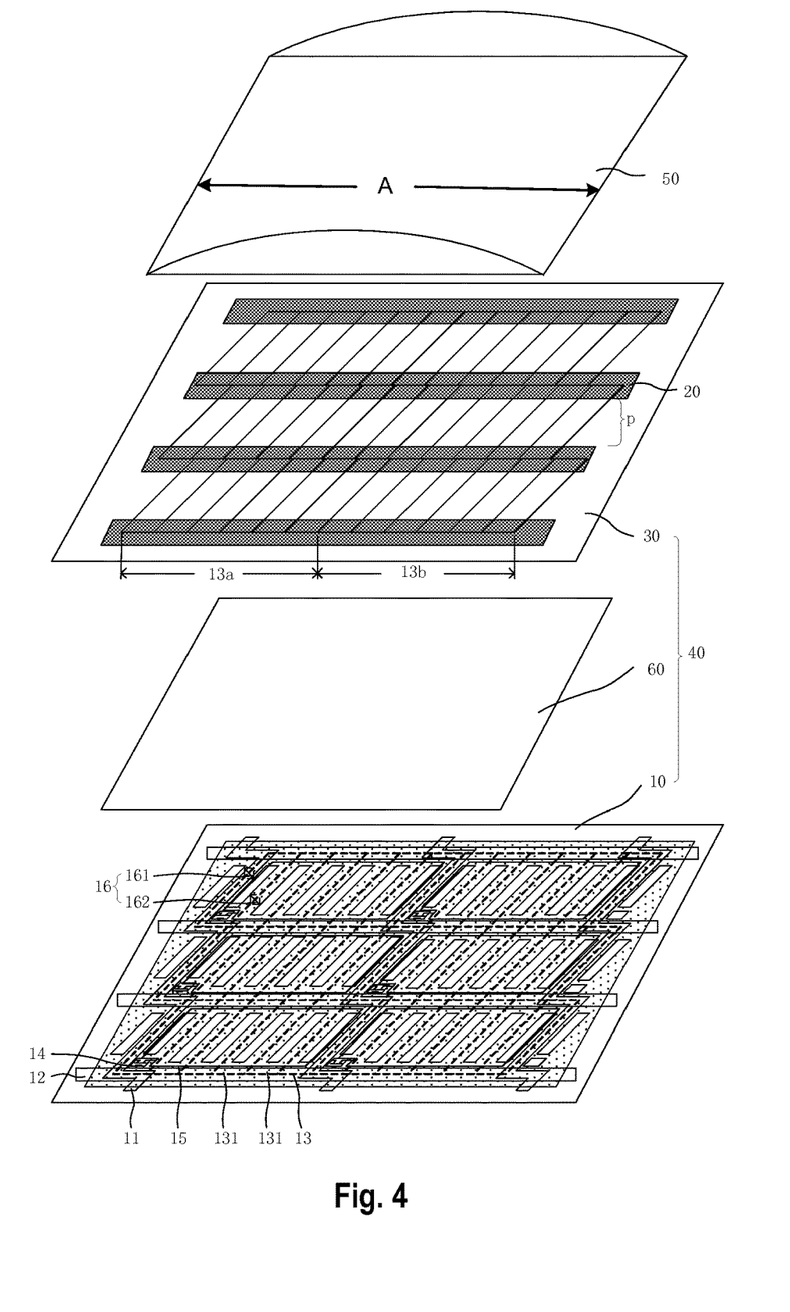
FIG. 4 is a schematic diagram of a structure of a display device according to an embodiment of the disclosure.

Referring to FIG. 4 which is a schematic diagram of a structure of a display device according to an embodiment of the disclosure, the display device includes a display panel 40 and a grating 50 which is disposed on the display panel 40. The display panel 40 includes a first substrate 10, a second substrate 30 disposed opposite to the first substrate 10, and a liquid crystal layer 60 between the first substrate 10 and the second substrate 20, and the grating 50 is of a slit type or a lenticular lens type.

A plurality of data lines 11 and a plurality of scan lines 12 are located on one side of the first substrate 10 close to the liquid crystal layer 60, and the plurality of data lines 11 intersect with the plurality of scan lines 12 to form a plurality of pixels 13. As shown in FIG. 4, merely for purposes of illustration, six pixels 13 arranged in three rows and two columns are illustrated. Each of the pixels 13 includes: a switch element 14 located near the intersection of a data line 11 and a scan line 11; a pixel electrode 15 electrically connected to the switch element 14; and a common electrode 16 located on one side of the first substrate 10 close to the liquid crystal layer 60; where the common electrode 16 includes a plurality of first common electrodes 161 superposing the plurality of data lines 11 or the plurality of scan lines 12 and a plurality of second common electrodes 162 overlapping with the pixel area 130, the plurality of first common electrodes 161 have the same first width, and the plurality of second common electrodes 162 have the same second width identical with the first width. Each of the pixels 13 includes at least one second common electrode 162, and the pixel 13 is divided by the at least one second common electrode 162 into a plurality of sub-pixels 131 having the same area. Each pixel in FIG. 4 includes five second common electrodes 162, and is divided by these five second common electrodes 162 into six sub-pixels 131 having the same area.

The second substrate 30 is provided with a plurality of pixels, whose positions correspond respectively to the pixel 13 on the first substrate 10. For example, pixels are color pixels, pixels of the same color in a plurality of color pixels are arranged in rows and pixel rows of different colors are arranged in columns. Referring to FIG. 4, which illustrates an exemplary embodiment, only six pixels which are arranged in three rows and two columns and corresponding to the six pixels on the first substrate 10 are illustrated on the second substrate 30, the pixels in a first row are Blue (B) pixels, the pixels in a second row are Green (G) pixels, the pixels in a third row are Red (R) pixels, where three neighboring pixels including a B pixel, a G pixel and a R pixel form a pixel unit, three pixels including a B pixel, a G pixel and a R pixel in the first column are defined to be a left pixel unit 13a, three pixels including a B pixel, a G pixel and a R pixel in the second column are defined to be a right pixel unit 13b herein.

A light shielding layer 20 is disposed in areas, which correspond to the scan lines 12, on the second substrate, the sub-pixels 131 are partially covered by the light shielding layer 20, and areas of the sub-pixels 131, which are uncovered by the light shielding layer 20, form a light transmitting area p which has a parallelogram shape.

For the respective sub-pixels 131 of each pixel 13 in the same row, top sides of the respective light transmitting areas are arranged in the same line and bottom sides of the respective light transmitting areas are arranged in the same line. A downward projection of a top side of a light transmitting area in each sub-pixel along a direction perpendicular to the row is located at and coincides with a bottom side of a light transmitting area in a neighboring sub-pixel, and an upward projection of a bottom side of the light transmitting area in said each sub-pixel along the direction perpendicular to the row is located at and coincides with a top side of a light transmitting area in another neighboring sub-pixel.

Taking a semi-cylindrical lenticulation as an example, the semi-cylindrical lenticulation consists of a plurality of spindly semi-cylindrical lens 50 closely arranged, and a periodic length of each of the semi-cylindrical lens is denoted by A.

Referring to FIG. 4 which shows the corresponding relationship between one periodic length of the semi-cylindrical lens and the second substrate 30, the semi-cylindrical lenticulation is disposed in front of the second substrate 30, i.e. the semi-cylindrical lenticulation faces a viewer, the second substrate 30 is located at the back of the semi-cylindrical lenticulation, a periodic length A of the semi-cylindrical lens corresponds to X pixels, i.e. the periodic length A of the semi-cylindrical lens is X times larger than the width of each pixel 13 along the row direction, and X is equal to or larger than two, for example, X may be 2, 3, 4, 5, . . . . In the present embodiment, X is equal to 2, i.e. the semi-cylindrical lenticulation corresponds to two pixels on the second substrate 30, which particularly are the left pixel 13a and the right pixel 13b, thus a viewer will not see any black and white strips on an image presented on the display panel when viewing the display panel through the grating, thereby improving the display quality of the image.

In the present embodiment, the display panel may be either a 2D display panel or a 3D display panel, and the switch between the 2D display and the 3D display may be achieved by the lenticulation, that is, when the lenticulation is powered on, images are displayed in a 3D manner, and when the grating is powered off and become transparent, images are displayed in a 2D manner.

In the display panel and display device provided in the disclosure, the width of each of a plurality of first common electrodes superposing a plurality of data lines or a plurality of scan line is set as same as the width of each of a plurality of second common electrodes overlapping with the pixel area, or the slit width of each of a plurality of first slits in the common electrode located above the plurality of data lines or scan lines is set as same as a slit width of each of the plurality of second slits in the common electrode in the pixel area, so that when the display panel is powered on, light intensities in the pixel areas and the electrode wiring areas are periodically and evenly distributed, Moire fringes are avoided in the overall displaying effect, thereby improving the display quality of an image.

It is noted that the above descriptions are merely for the preferable embodiments and the adopted technical principle of the present invention. A skilled person in the art will understand that the present invention is not limited to those specific embodiments, and various modifications, variations and replacement may be made to the present invention by one of ordinary skills in the art without departing from the spirit and scope of the invention. Therefore, although the present invention is described in detail through the above embodiments, the present invention is not limited to those above embodiments, other equivalents may be included in the present invention without departing from the concept of the invention, and the scope of the invention is defined by the accompanied claims.

What is claimed is:

1. A display panel, comprising:
a first substrate, a second substrate disposed opposite to the first substrate, and a liquid crystal layer disposed between the first substrate and the second substrate;
a plurality of data lines and a plurality of scan lines located on a first side of the first substrate close to the liquid crystal layer, the plurality of data lines intersecting with the plurality of scan lines to form a plurality of pixels, wherein each of the pixels comprises a pixel area, a switch element located near an intersection of one of the data lines and one of the scan lines, and a pixel electrode located in the pixel area and electrically connected to the switch element;
a plurality of dummy electrodes located on the first side of the first substrate; and
a common electrode located on the first side of the first substrate,
wherein the common electrode comprises:
a plurality of first common electrodes superposing the plurality of data lines or the plurality of scan lines, the plurality of first common electrodes having a same first width; and
a plurality of second common electrodes overlapping with the pixel area, the plurality of second common electrodes having a same second width identical with the first width,
wherein an orthogonal projection of a first common electrode of the plurality of first common electrodes onto the first substrate overlaps with an orthogonal projection of a data line of the plurality of data lines or an orthogonal projection of a scan line of the plurality of scan lines onto the first substrate, thereby providing an overlapped area having a width equal to a width of the data line of the plurality of data lines or a width of the scan line of the plurality of scan lines.

2. The display panel according to claim 1, wherein each of the pixels comprises at least one second common electrode, and the pixel is divided by the at least one second common electrode into a plurality of sub-pixels having a same area.

3. The display panel according to claim 2, wherein each of the pixels comprises a total number of 2 to 4 second common electrodes.

4. The display panel according to claim 2, wherein the data lines or the scan lines are formed in a zigzag pattern, each sub-pixel has a parallelogram shape, and the sub-pixels in a same row are inclined in a same direction.

5. The display panel according to claim 4, wherein a light shielding layer is disposed on the second substrate and in areas corresponding to the scan lines or the data lines, the sub-pixels are partially covered by the light shielding layer, and areas of the sub-pixels uncovered by the light shielding layer form light transmitting areas having a parallelogram shape;
in the sub-pixels of each pixel in a same row, top sides of the respective light transmitting areas are arranged in a same line, bottom sides of the respective light transmitting areas are arranged in a same line, and a downward projection of a top side of a light transmitting area in each sub-pixel along a direction perpendicular to a row is located at and coincides with a bottom side of a light transmitting area in a neighboring sub-pixel, and an upward projection of a bottom side of the light transmitting area in each sub-pixel along the direction perpendicular to the row is located at and coincides with a top side of a light transmitting area in another neighboring sub-pixel.

6. The display panel according to claim 1, wherein the common electrode further comprises a plurality of third common electrodes located in the pixel area, each of the plurality of third common electrodes has a same third width.

7. The display panel according to claim 6, wherein the third width is same as or different from the first width.

8. The display panel according to claim 6, wherein the third width is same as or different from the second width.

9. The display panel according to claim 6, wherein at least one of the third common electrodes is disposed between the first common electrode and the second common electrode, and at least one of the third common electrodes is disposed between the plurality of second common electrodes.

10. The display panel according to claim 1, wherein an orthogonal projection of a second common electrode of the plurality of second common electrodes onto the first substrate overlaps with an orthogonal projection of a dummy electrode of the plurality of dummy electrodes onto the first substrate, thereby providing an overlapped area having a width equal to a width of the dummy electrode of the plurality of dummy electrodes.

11. A display device comprising a display panel, wherein the display panel comprises:
    a first substrate, a second substrate disposed opposite to the first substrate, and a liquid crystal layer disposed between the first substrate and the second substrate;
    a plurality of data lines and a plurality of scan lines located on a first side of the first substrate close to the liquid crystal layer, the plurality of data lines intersecting with the plurality of scan lines to form a plurality of pixels, each of the pixels comprises a pixel area, a switch element located near an intersection of one of the data lines and one of the scan lines, and a pixel electrode located in the pixel area and electrically connected to the switch element;
    a plurality of dummy electrodes located on the first side of the first substrate; and
    a common electrode located on the first side of the first substrate,
    wherein the common electrode comprises:
    a plurality of first common electrodes superposing the plurality of data lines or the plurality of scan lines, the plurality of first common electrodes having a same first width; and
    a plurality of second common electrodes overlapping with the pixel area, the plurality of second common electrodes having a same second width identical with the first width,
    wherein an orthogonal projection of a first common electrode of the plurality of first common electrode onto the first substrate overlaps with an orthogonal projection of a data line of the plurality of data lines or an orthogonal projection of a scan line of the plurality of scan lines onto the first substrate, thereby providing an overlapped area having a width equal to a width of the data line of the plurality of data lines or a width of the scan line of the plurality of scan lines.

12. The display device according to claim 11, further comprising a grating disposed on the display panel, the grating being of a slit type or a lenticular lens type.

13. The display device according to claim 12, wherein a period length of the grating is X times larger than a width of a pixel along a row direction, X being an integer equal to or larger than two.

14. The display device according to claim 11, wherein the common electrode further comprises a plurality of third common electrodes located in the pixel area, each of the plurality of third common electrodes has a same third width.

15. The display device according to claim 14, wherein the third width is same as or different from the first width.

16. The display device according to claim 14, wherein the third width is same as or different from the second width.

17. The display device according to claim 14, wherein at least one of the third common electrodes is disposed between the first common electrode and the second common electrode, and at least one of the third common electrodes is disposed between the plurality of second common electrodes.

18. The display panel according to claim 11, wherein an orthogonal projection of a second common electrode of the plurality of second common electrodes onto the first substrate overlaps with an orthogonal projection of a dummy electrode of the plurality of dummy electrodes onto the first substrate, thereby providing an overlapped area having a width equal to a width of the dummy electrode of the plurality of dummy electrodes.

* * * * *